United States Patent
Martineau et al.

(10) Patent No.: US 10,841,557 B2
(45) Date of Patent: Nov. 17, 2020

(54) CONTENT NAVIGATION

(71) Applicant: Samsung Electronics Co., Ltd., Suwon-si, Gyeonggi-do (KR)

(72) Inventors: Justin Martineau, San Jose, CA (US); Jonathan J. Currey, Belmont, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 30 days.

(21) Appl. No.: 15/435,186

(22) Filed: Feb. 16, 2017

(65) Prior Publication Data
US 2017/0332064 A1    Nov. 16, 2017

Related U.S. Application Data

(60) Provisional application No. 62/335,458, filed on May 12, 2016.

(51) Int. Cl.
*H04N 13/117* (2018.01)
*H04N 13/178* (2018.01)
(Continued)

(52) U.S. Cl.
CPC .......... *H04N 13/117* (2018.05); *G06F 3/011* (2013.01); *G06F 3/012* (2013.01);
(Continued)

(58) Field of Classification Search
CPC ...... G06F 3/011; G06F 3/012; G06F 3/04815; G06T 19/006; H04N 13/117;
(Continued)

(56) References Cited

U.S. PATENT DOCUMENTS 7,606,442 B2 * 10/2009 Pilu .................. G06K 9/3233
                                                        382/190
8,739,060 B2    5/2014 Lipsky et al.
(Continued)

FOREIGN PATENT DOCUMENTS

WO    2013016707 A1    1/2013

OTHER PUBLICATIONS

International Search Report and Written Opinion dated Aug. 22, 2017 for International Application PCT/KR2017/004955 from Korean Intellectual Property Office, pp. 1-9, Republic of Korea.
(Continued)

*Primary Examiner* — Eileen M Adams
(74) *Attorney, Agent, or Firm* — Sherman IP LLP; Kenneth L. Sherman; Hemavathy Perumal

(57) ABSTRACT

One embodiment provides a method comprising receiving a piece of content and salient moments data for the piece of content. The method further comprises, based on the salient moments data, determining a first path for a viewport for the piece of content. The method further comprises displaying the viewport on a display device. Movement of the viewport is based on the first path during playback of the piece of content. The method further comprises generating an augmentation for a salient moment occurring in the piece of content, and presenting the augmentation in the viewport during a portion of the playback. The augmentation comprises an interactive hint for guiding the viewport to the salient moment.

20 Claims, 13 Drawing Sheets

(51) Int. Cl.
  *H04N 13/344* (2018.01)
  *H04N 13/398* (2018.01)
  *G06F 3/01* (2006.01)
  *G06F 3/0481* (2013.01)
  *G06T 19/00* (2011.01)
  *H04N 13/00* (2018.01)

(52) U.S. Cl.
  CPC ........ *G06F 3/04815* (2013.01); *G06T 19/006* (2013.01); *H04N 13/178* (2018.05); *H04N 13/344* (2018.05); *H04N 13/398* (2018.05); *H04N 2013/0092* (2013.01)

(58) Field of Classification Search
  CPC .. H04N 13/178; H04N 13/344; H04N 13/398; H04N 2013/0092
  See application file for complete search history.

(56) References Cited

U.S. PATENT DOCUMENTS

| | | | |
|---|---|---|---|
| 8,797,315 | B1 | 8/2014 | Kuhne |
| 8,831,380 | B2 | 9/2014 | Ofek et al. |
| 8,990,690 | B2 | 3/2015 | Lin et al. |
| 9,024,947 | B2 | 5/2015 | Coombe et al. |
| 10,390,067 | B1 * | 8/2019 | Shetty ................ G06K 9/00718 |
| 2011/0113334 | A1 | 5/2011 | Joy et al. |
| 2011/0211040 | A1 | 9/2011 | Lindemann et al. |
| 2012/0089904 | A1 | 4/2012 | Datha et al. |
| 2012/0194420 | A1 | 8/2012 | Osterhout et al. |
| 2013/0127907 | A1 * | 5/2013 | Lee ........................ G09G 5/377 345/633 |
| 2013/0127980 | A1 | 5/2013 | Haddick et al. |
| 2013/0222371 | A1 | 8/2013 | Reitan |
| 2013/0321461 | A1 | 12/2013 | Filip |
| 2014/0168277 | A1 | 6/2014 | Ashley et al. |
| 2014/0199043 | A1 | 7/2014 | Guntur et al. |
| 2015/0128046 | A1 | 5/2015 | Cormican et al. |
| 2015/0256808 | A1 * | 9/2015 | MacMillan ............. G06F 16/71 348/43 |
| 2015/0309705 | A1 | 10/2015 | Keeler et al. |
| 2015/0379086 | A1 * | 12/2015 | Sheridan ........... G06F 17/30522 707/748 |
| 2017/0103535 | A1 * | 4/2017 | Mathsyendranath ..... G06T 3/40 |
| 2017/0270570 | A1 * | 9/2017 | Binas ................. G06Q 30/0277 |
| 2017/0316806 | A1 * | 11/2017 | Warren ................ G11B 27/031 |

OTHER PUBLICATIONS

Extended European Search Report dated Mar. 8, 2019 for European Application No. 17779643 1.9 from European Patent Office, pp. 1-9, Munich, Germany.

* cited by examiner

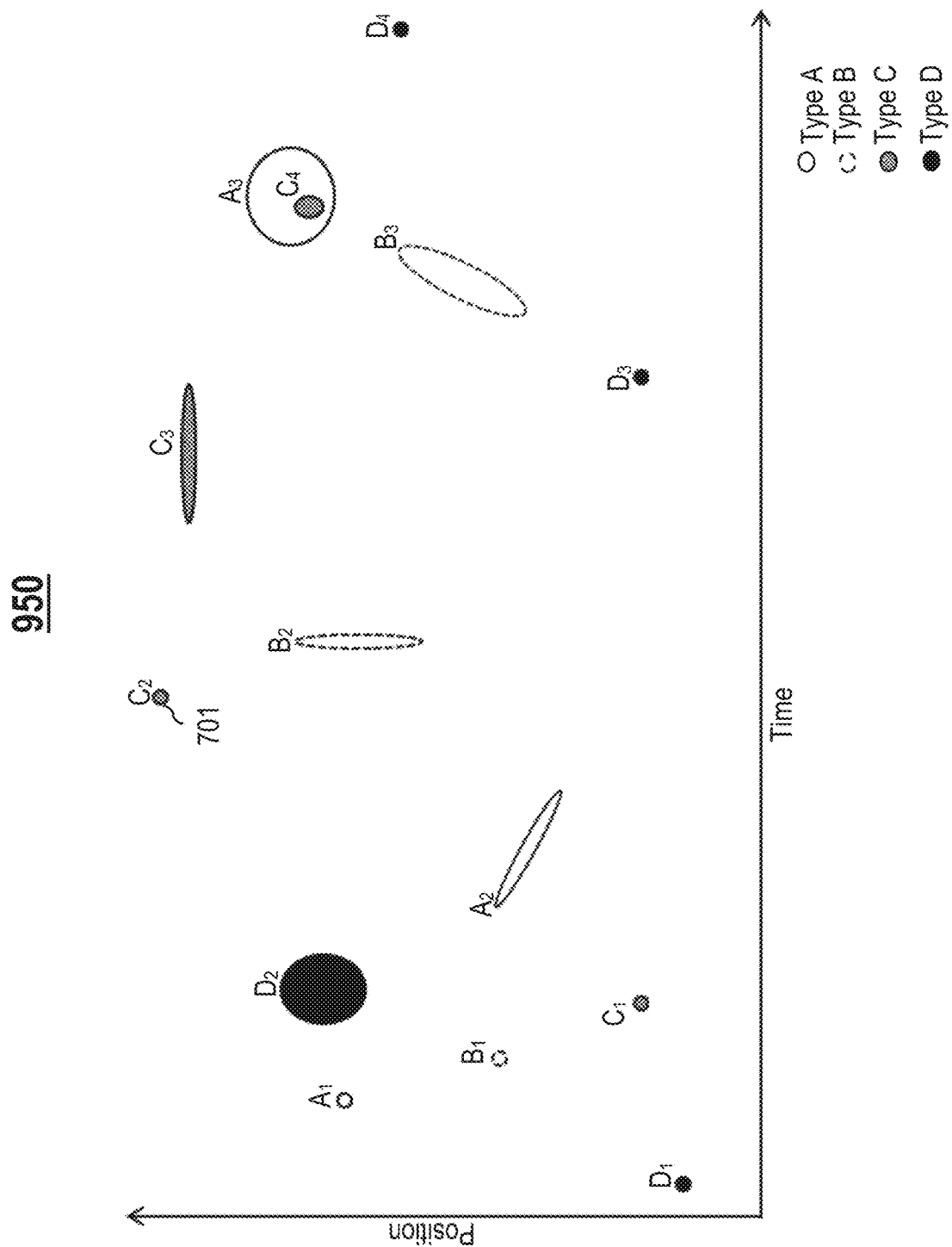

CONTENT NAVIGATION

CROSS REFERENCE TO RELATED APPLICATIONS

This application claims priority from U.S. Provisional Patent Application Ser. No. 62/335,458, filed on May 12, 2016, incorporated herein by reference.

TECHNICAL FIELD

One or more embodiments relate generally to content navigation, and in particular, generating an interactive viewport providing content navigation.

BACKGROUND

A three hundred sixty (360) degree video comprises images that may be captured by a 360 degree video camera or a traditional camera if the traditional camera is rotated around freely. A viewer (i.e., a user) may view the 360 degree video utilizing a virtual reality (VR) device (e.g., VR goggles or headsets) that provides a viewport that moves in sync with movement and orientation of the viewer's head. The viewport allows the viewer to view what he/she would see in person at a position where a camera was positioned at the time the 360 degree video was captured.

SUMMARY

One embodiment provides a method comprising receiving a piece of content and salient moments data for the piece of content. The method further comprises, based on the salient moments data, determining a first path for a viewport for the piece of content. The method further comprises displaying the viewport on a display device. Movement of the viewport is based on the first path during playback of the piece of content. The method further comprises generating an augmentation for a salient moment occurring in the piece of content, and presenting the augmentation in the viewport during a portion of the playback. The augmentation comprises an interactive hint for guiding the viewport to the salient moment.

These and other features, aspects and advantages of the one or more embodiments will become understood with reference to the following description, appended claims and accompanying figures.

BRIEF DESCRIPTION OF THE DRAWINGS

FIG. 6 is an example spatiotemporal graph illustrating different types of salient moments occurring in a piece of content, in one or more embodiments;

DETAILED DESCRIPTION

Figure 1:
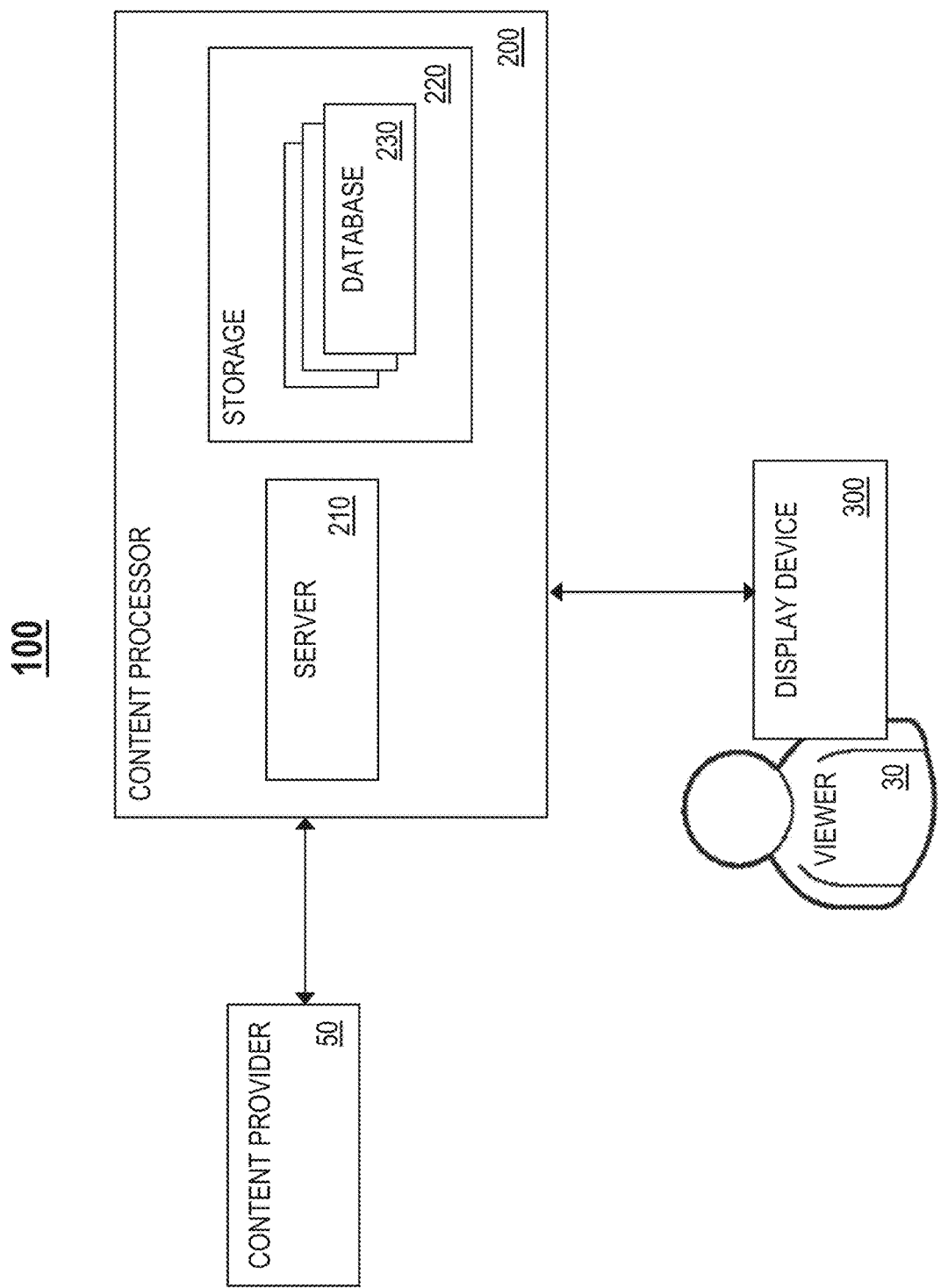
FIG. 1 illustrates an example framework for content navigation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

For expository purposes, the term "salient moment" as used herein refers to a point of interest in a piece of content. A point of interest has a specific point location (i.e., position) in a piece of content and occurs during a specific period of time during playback of the piece of content. A general audience may find a point of interest useful or interesting.

For expository purposes, the term "viewport" as used herein refers to a framed area on a display screen for viewing and navigating through a piece of content during playback of the piece of content. The term "augmented reality augmentation" as used herein refers to an overlay of information on a viewport.

One embodiment provides a method comprising receiving a piece of content and salient moments data for the piece of content. The method further comprises, based on the salient moments data, determining a first path for a viewport for the piece of content. The method further comprises displaying the viewport on a display device. Movement of the viewport is based on the first path during playback of the piece of content. The method further comprises generating an augmentation for a salient moment occurring in the piece of content, and presenting the augmentation in the viewport during a portion of the playback. The augmentation comprises an interactive hint for guiding the viewport to the salient moment.

One or more embodiments relate generally to content navigation, and in particular, generating an interactive viewport providing content navigation. One embodiment provides a method comprising receiving content for playback on a display device and generating an augmentation for the content. The augmentation comprises an interactive hint for guiding a viewport to a salient moment occurring in the content. The method further comprises presenting the augmentation in the viewport during a portion of the playback.

Viewing content (e.g., a three hundred sixty (360) degree video) without a virtual reality (VR) device (e.g., VR goggles or headsets) may be taxing. Unlike a viewer interface provided by a VR device, a viewer interface provided by another medium may be less precise and requires more user effort to manually adjust a viewport. For example, a web browser may provide a viewer interface that allows movement of a viewport viewed via the web browser using key presses. As another example, a smart phone may provide a viewer interface that allows movement of a viewport viewed via the smart phone using swipes. As yet another example, a conventional television may not provide a viewer interface that allows movement of a viewport viewed via the television.

A viewer (i.e., a user) viewing a viewport via a web browser, a smart phone, a television, or a medium other than a VR device may tire and/or get frustrated quickly as the viewer has to constantly manually adjust the viewport. To alleviate this burden, a content provider for content (e.g., a 360 degree video) may provide a director's cut comprising metadata pre-specifying a path in the content that a viewport for the content should be centered at any given moment. If a viewer decides to manually change the viewport, the viewer interface may cause the viewport to immediately spring back into position on the path. This may result in a jarring/unpleasant viewing experience for the viewer.

Furthermore, as a viewer may have different tastes and/or interest, conflicts between the director's cut and where the viewer wants to view at any given time may occur, resulting in an unpleasant back and forth fight for control of the viewport. Surrendering viewer control of the viewport to the director's cut removes the viewer's ability to interact with the content. A viewer who is unable to interact with content gets less satisfaction out of viewing the content passively than he/she would have had he/she been able to actively interact with the content. Further, a viewer may not know in advance where and when content may include points of interest to the viewer.

One embodiment provides a viewport that allows a viewer to know when and where the viewer should look in the viewport, and allows the viewer to interact with the viewport.

One embodiment provides a method and a system for identifying one or more points of interest in a piece of content, and assisting a viewer with viewing the points of interest identified. The system customizes viewport selection for a piece of content. The system allows a viewport to adaptively adapt/change the view it provides based on viewer interaction (i.e., user interaction). The system eliminates twitchy/shaky back and forth movement of the viewport (e.g., switching between a view presenting a director's cut and another view presenting a viewer's desired path through the piece of content). The system allows a viewer to locate points of interest in a piece of content to view. The system alleviates difficulties encountered with a viewer interface when navigating between different points of interest in a piece of content.

FIG. 1 illustrates an example framework 100 for content navigation, in one or more embodiments. The framework 100 comprises a content processor 200 including one or more server devices 210 and one or more storage devices 220. The one or more storage devices 220 may maintain one or more databases 230. As described in detail later herein, one or more applications may execute/operate on the one or more server devices 210 to facilitate content navigation.

One or more viewers 30 may have access to one or more electronic display devices 300. In one embodiment, each display device 300 is configured to exchange data with the content processor 200 (e.g., over a connection such as WiFi, or a cellular data connection). Examples of a display device 300 include, but are not limited to, one of the following: a television (TV), a tablet, a smart phone, a monitor, a computer, a laptop, etc.

In one embodiment, one or more content providers 50 may be located remotely relative to the content processor 200. Each content provider 50 is configured to provide content. In one embodiment, each content provider 50 is configured to exchange data with the content processor 200 over a connection (e.g., a wireless connection, a wired connection, or a combination of the two).

Figure 2:
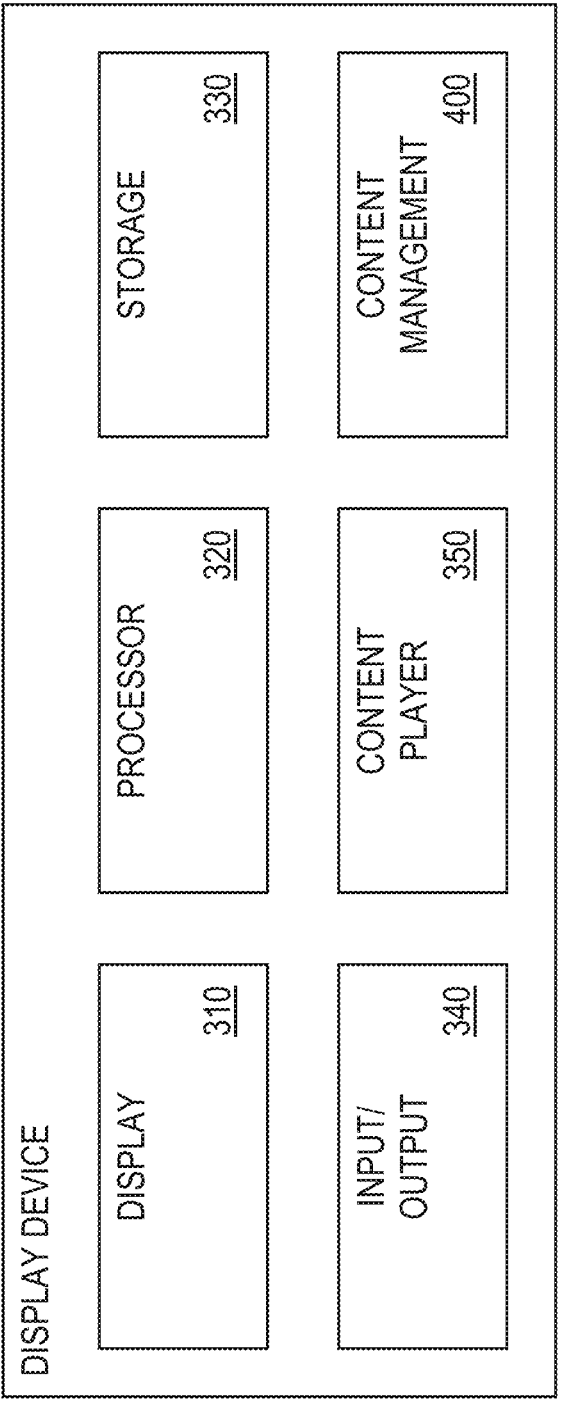
FIG. 2 illustrates an example display device in detail, in one or more embodiments.

FIG. 2 illustrates an example display device 300 in detail, in one or more embodiments. The display device 300 comprises a processor 320 and a storage unit 330. The display device 300 further comprises a display screen 310 and one or more other input/output (I/O) modules 340, such as a keyboard, a keypad, a touch interface, etc.

One or more applications may execute/operate on the processor 320. In one embodiment, the applications include a content player 350 and a content management system 400. The content player 350 (e.g., a 360 degree video player) is configured to control playback of a piece of content (e.g., a 360 degree video) on the display screen 310. The content player 350 may be embedded in a web page or operate as a standalone application program. As described in detail later herein, the content management system 400 is configured to facilitate viewer navigation of a viewport for a piece of content during playback of the piece of content on the display screen 310.

In one embodiment, the display device 300 comprises and/or is coupled with one or more sensors (e.g., a camera, a microphone, etc.) for capturing contextual and/or environmental data. Examples of contextual and/or environmental data may include, but are not limited to, visual feedback data (e.g., photos) capturing facial reactions (e.g., smiling) of a viewer 30 during content playback, audio data (e.g., voice recordings) capturing vocal reactions (e.g., cheering, booing, etc.) of the viewer 30 during the content playback, etc. In one embodiment, the facial reactions captured may be classified (e.g., using deep learning) to determine emotional reactions of the viewer 30 to the piece of content.

Figure 3:
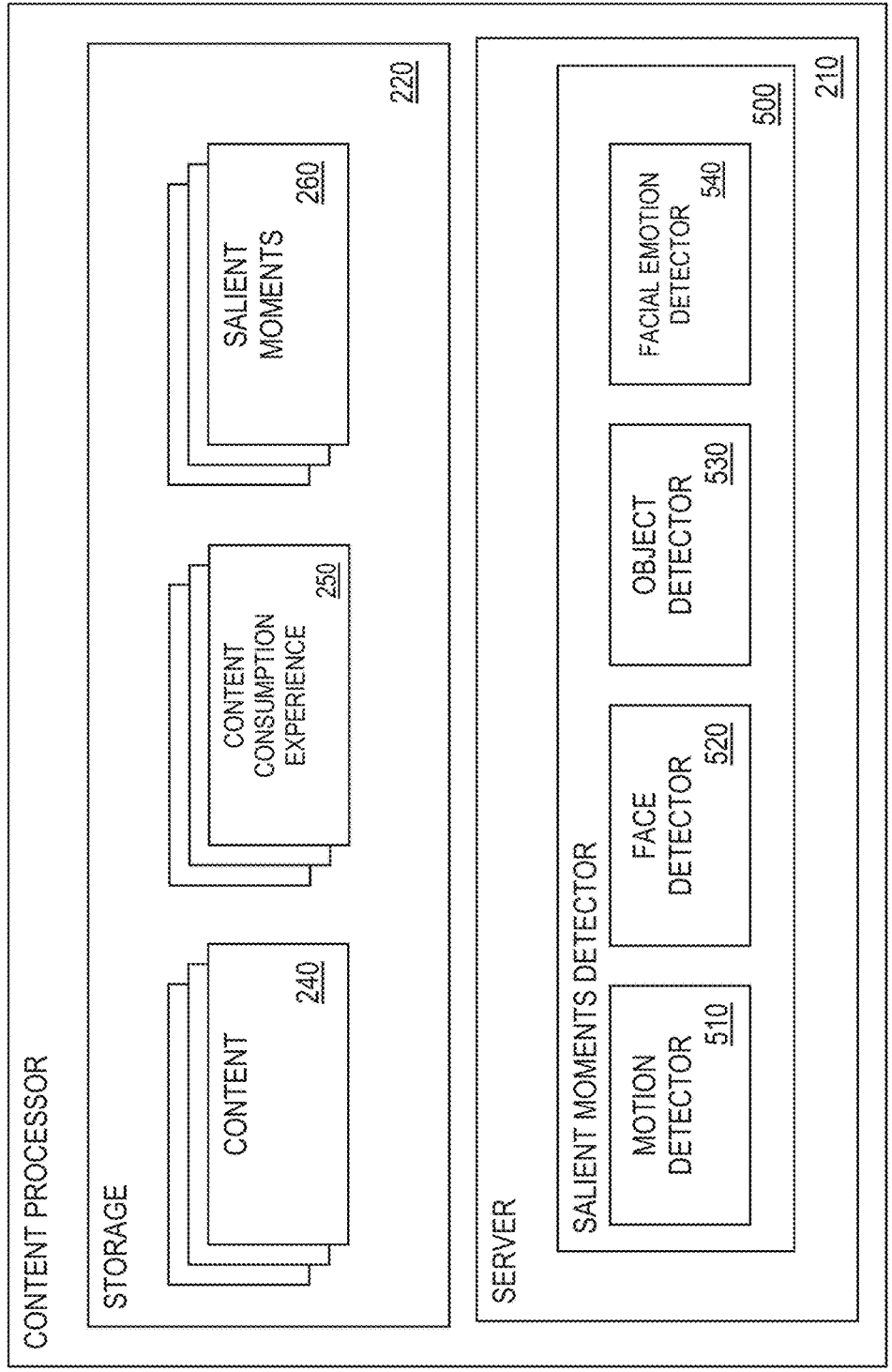
FIG. 3 illustrates an example content processor in detail, in one or more embodiments.

FIG. 3 illustrates an example content processor 200 in detail, in one or more embodiments. As stated above, the storage devices 220 may maintain one or more databases 230 (FIG. 1). For example, the storage devices 220 may include at least one of the following: (1) a set of databases 240 maintaining content information for one or more pieces of content, (2) a set of databases 250 maintaining content consumption experience data for the one or more pieces of content, and (3) a set of databases 260 maintaining salient moments data for the one or more pieces of content.

In one embodiment, content information for a piece of content comprises the piece of content itself (e.g., a 360 degree video) and corresponding metadata (e.g., metadata specifying a director's cut for a viewport for the 360 degree video).

In one embodiment, content consumption experience data for a piece of content comprises, but is not limited to, at least one of the following: (1) a history of viewer interactions with one or more viewports for the piece of content, and (2) general preferences of a general audience based on a survey of one or more viewers 30.

In one embodiment, salient moments data for a piece of content identifies one or more salient moments occurring in the piece of content.

As stated above, one or more applications may execute/operate on the one or more server devices 210 to facilitate content navigation. In one embodiment, the applications include a salient moments detector 500 configured to identify one or more salient moments occurring in a piece of content. In one embodiment, before a piece of content is available for viewing on a display device 300, the piece of content is processed offline by the content processor 200 to identify one or more salient moments occurring in the piece of content. The display device receives, from the content processor 200, salient moments data indicative of the one or more salient moments identified.

The salient moments detector 500 may be implemented with neural networks or other image processing technology. In one embodiment, the salient moments detector 500 comprises at least one of the following components: (1) a motion detector 510 (e.g., an optical flow detector, a H.264 motion estimation detector, etc.) configured to detect occurrence of one or more salient moments with a degree of motion, (2) a face detector 520 configured to detect occurrence of one or more faces, (3) an object detector 530 configured to detect occurrence of one or more objects, and categorize each object detected (e.g., cats, dogs, people, cars, etc.), and (4) a facial emotion detector 540 configured to detect occurrence of one or more changes in facial emotion/expression.

In one embodiment, the face detector 520 is further configured to perform at least one of the following with regards to a face detected in a piece of content: (1) recognize the face, (2) determining whether the face is speaking based on mouth movement or audio/video fusion, and (3) identifying the face as belonging to a member of a particular group.

In one embodiment, the salient moments detector 500 includes a component for detecting directional audio. In one embodiment, the salient moments detector 500 includes a component for detecting and recognizing human action/activity. In one embodiment, the salient moments detector 500 includes a component for detecting human and object interaction. In one embodiment, the salient moments detector 500 includes a component for extracting a key shot from a piece of content (e.g., extracting a frame from a piece of content that is potentially most memorable).

In one embodiment, the salient moments detector 500 is further configured to determine, for at least one salient moment identified in a piece of content, a corresponding type of the salient moment and a corresponding strength value ("strength score") indicative of an intensity of the salient moment.

In one embodiment, content consumption experience data may include visual feedback data capturing facial reactions (e.g., smiling, frowning), audio feedback data capturing vocal reactions (e.g., laughing, etc.), and/or playback feedback data capturing viewer interactions with playback of the piece of content (e.g., frequency at which a viewer 30 replayed a portion of the piece of content, etc.). A facial reaction, a vocal reaction, and/or a viewer interaction may represent a particular type of salient moment. As described in detail later herein, a strength score for a particular type of salient moment may be modified based on a multiplier/weight specified in user preferences and/or general preferences for this particular type. For example, a salient moment of type "funny" may be associated with vocal reactions that include laughing, whereas a salient moment of type "serious" may be associated with facial reactions that include frowning. If user preferences and/or general preferences indicate a preference for salient moments of type "funny" over salient moments of type "serious", salient moments of type "funny" would have higher strength scores compared to salient moments of type "serious".

In one embodiment, a set of facial emotions/expression are extracted from the piece of content. Each facial emotion/expression extracted may be classified (e.g., using deep learning) to determine a type of emotion corresponding to the facial emotion/expression. Each type of emotion may represent a particular type of salient moment; a strength score for this type of emotion may be modified based on a multiplier/weight specified in user preferences and/or general preferences specified for the particular type of salient moment. Similarly, changes in facial emotion/expression may be extracted. A change in facial emotion/expression may also represent a particular type of salient moment.

Figure 4:
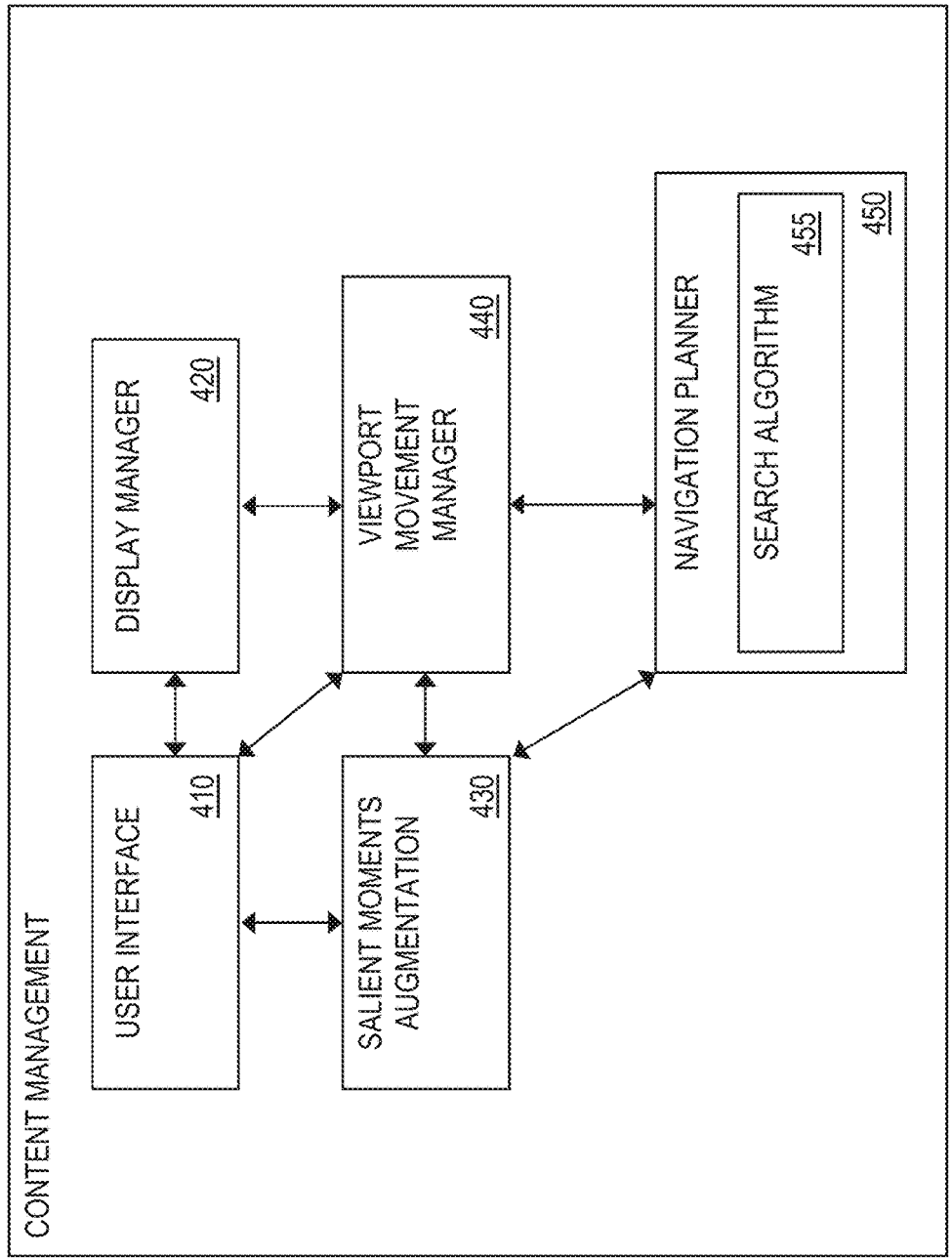
FIG. 4 illustrates an example content management system in detail, in one or more embodiments.

FIG. 4 illustrates an example content management system 400 in detail, in one or more embodiments. The content management system 400 comprises at least one of the following: (1) a display manager 420 configured to lay and render a viewport for a piece of content on a display screen 310 (FIG. 2) of a display device 300 (FIG. 1), (2) a user interface unit 410 configured to monitor and detect a viewer interaction with the viewport via one or more I/O modules 340 (FIG. 2) of the display device 300, (3) a salient moments augmentation unit 430 configured to generate one or more augmented reality augmentations leading to one or more salient moments occurring in the piece of content, (4) a viewport movement manager 440 configured to control movement of the viewport on the display screen 310, and (5) a navigation planner 450 configured to determine which salient moments occurring in the piece of content to present in the viewport, and when the salient moments should be presented.

The navigation planner 450 selects one or more viewports for the piece of content to display on the display screen 310. The navigation planner 450 may use only one viewport or allow one or more additional viewports, if necessary.

The navigation planner 450 determines where a viewport should be centered at any given moment. Specifically, the navigation planner 450 determines a recommended path for the viewport. Movement of the viewport displayed on the display screen 310 is initially based on the recommended path. The recommended path is indicative of which salient moments occurring in the piece of content to present/focus on in the viewport, and when the salient moments should be presented/focused on.

In one embodiment, the navigation planner 450 determines a recommended path for a viewport based on a state space search algorithm 455. Any type of state space search algorithm 455 may be used, such as Dijkstra and its variants, breadth first, depth first, etc. The search algorithm 455 decides which salient moment to transition to based on a strength score for the salient moment. The search algorithm 455 selects a recommended path that has the highest overall score (i.e., highest aggregate of strength scores for all salient moments included in the path).

In another embodiment, the navigation planner 450 determines a recommended path for a viewport based on a set of rules. In yet another embodiment, the navigation planner 450 determines a recommended path for a viewport based on a constraint satisfaction problem.

Different factors may affect formation of a recommended path, such as user preferences of the viewer 30 and/or general preferences of a general audience. User preferences and/or general preferences may be weighted. Examples of user preferences and/or general preferences include, but are not limited to, minimum/maximum speeds to pan a camera when transitioning between salient moments, desired density of salient moments, how early the viewport should arrive at a salient moment, how long (i.e., duration) the camera should stay in an area of a salient moment after the salient moment has passed, degree to which a salient moment should stay centered in the viewport, whether panning the camera to a salient moment is preferred over making a direct jump to the salient moment, preferences for viewing the piece of content while moving forward through time, flashback preferences (e.g., flashback frequency, total number of flashbacks, and minimum/maximum duration of a flashback).

In one embodiment, a strength score for a salient moment of particular type may be modified/weighted based on a multiplier/weight specified in user preferences and/or general preferences for the particular type. For example, if salient moments of a particular type are favored, a strength score for a salient moment of the particular type may be personalized/customized by multiplying the strength score by a multiplier/weight specified in user preferences and/or general preferences for the particular type.

In one embodiment, to resolve conflicts, if any, between different salient moments available for selection, the navigation planner 450 may apply the search algorithm 455 to resolve the conflicts by finding a path that maximizes an overall score of the path based on the user and/or general preferences.

In one embodiment, user preferences and/or general preferences may be embodied as either hard constraints that cannot be violated or modifiers to strength scores for salient moments of particular types.

Based on salient moments data for the piece of content, the salient moments augmentation unit 430 generates at least one augmented reality augmentation. Each augmentation generated corresponds to one or more salient moments occurring in the piece of content. An augmentation may notify a viewer 30 viewing the viewport of one or more point locations or one or more points of interest represented by one or more corresponding salient moments. An augmentation may also be used to present to the viewer 30 summary information relating to one or more corresponding salient moments. For example, if an augmentation corresponds to a set of salient moments, the augmentation may indicate how many salient moments of the set are remaining for the viewer 30 to view or how many salient moments of the set that the viewer 30 has missed. In one embodiment, each augmentation generated for each salient moment comprises an interactive hint (e.g., a visual cue, a miniature map, etc.) indicating a location of and/or directions to a point location or a point of interest represented by a salient moment.

The viewer 30 may interact with an augmentation when the augmentation is presented in the viewport. The viewer 30 may interact with the augmentation using one or more I/O modules 340 of the display device 300 (e.g., selecting or tapping the augmentation using a touch interface or another I/O module 340 of the display device 300). In response to the user interface unit 410 detecting a viewer interaction with the augmentation, the navigation planner 450 instructs the viewport movement manager 440 to update the viewport to focus on a point location or point of interest specified by the augmentation.

The viewport may be updated by either generating a new viewport or moving the viewport such that the point location or point of interest is in the view of the viewer 30.

In one embodiment, multiple viewports may be displayed simultaneously to provide a split screen viewing experience. Simultaneously displaying multiple viewports may be beneficial in certain application scenarios, such as viewing debates (e.g., each viewport is a close-up of a particular debater), viewing multiplayer games, etc.

The viewport movement manager 440 determines how to move the viewport to present and maintain a salient moment occurring in the piece of content for the viewer 30. Specifically, the viewport movement manager 440 updates the viewport in response to receiving an instruction/command from the navigation planner 450 and/or the user interface unit 410. For example, the viewport movement manager 440 may update the viewport by panning the view from a current point location in the piece of content to another point location. The speed at which the view is panned between different point locations may be fast or slow. As another example, for a salient moment occurring in the piece of content, the viewport movement manager 440 may update the viewport by cutting/jumping directly to a point of interest represented by the salient moment. As yet another example, the viewport movement manager 440 may update the viewport by either zooming in to narrow the view (i.e., focus on a small subspace/area in the piece of content) or zooming out to expand the view.

In one embodiment, in response to detecting a user interaction with an augmentation for a salient moment, a weight assigned to the salient moment and one or more other salient moments occurring in the piece of content having the same type as the salient moment is strengthened, thereby increasing the likelihood that salient moments of such type are presented/focused on in the viewport in the future.

In one embodiment, the viewport movement manager 440 updates the viewport based on one or more factors. The factors include, but are not limited to, at least one of the following: (1) user preferences of the viewer 30 and/or general preferences of a general audience, (2) amount of time elapsed between salient moments occurring in the piece of content, (3) duration of at least one salient moment occurring in the piece of content, (4) strength score for at least one salient moment occurring in the piece of content, (5) type of at least one salient moment occurring in the piece of content, (6) one or more current viewer interactions of the viewer 30 with the viewport, (7) content consumption experience data for the piece of content, (8) one or more instructions/commands from the navigation planner 450 and/or the user interface unit 410, (9) a configuration mode of the display device 300 (e.g., whether the display device 300 is operating in an active mode, a sleep mode, etc.), (10) viewing history of the viewer 30 (e.g., pieces of content the viewer 30 previously viewed and detected viewer interactions with the pieces of content), and (11) contextual and/or environmental data of the viewer 30 and/or the display device 300.

In one embodiment, the navigation planner 450 prefers paths with a greater density of salient moments (i.e., amount of time elapsed between salient moments occurring in the piece of content is an important factor). This preference may be expressed by modifying strength scores for salient moments included in such paths (e.g., by a multiplier, adding, or combining with a different mathematical function).

In one embodiment, duration of at least one salient moment occurring in the piece of content is an important factor. A strength score for a salient moment may be modified using a mathematical function that considers an actual duration of the salient moment as compared against a preferred minimum/maximum duration specified in user preferences and/or general preferences. For example, the mathematical function may involve dividing the strength score for the salient moment by a penalty term that corresponds to a magnitude of a difference between the preferred minimum/maximum duration and the actual duration of the salient moment. The penalty term may be linearly weighted, logarithmically weighted, squared, square rooted, etc. Other types of mathematical functions may be used.

An example type of salient moment that may occur in the piece of content is the presence of certain objects in a scene. For example, a sports car in view may be a salient moment. A strength score for this salient moment may be greater if the sports car is clearly in view and looks very sporty. The strength score may be multiplied by a multiplier included in user preferences and/or general preferences for sports cars, thereby affecting likelihood of the search algorithm 455 selecting this salient moment to transition to when determining a recommended path. The strength score for this salient moment contributes to an overall score of a path that the salient moment is included in as the strength score is added to other strength scores of other salient moments included in the same path.

The content management system 400 facilitates customization/personalization of a viewport for the piece of content. The content management system 400 allows a view/focus of the viewport to dynamically adapt based on viewer interaction with the viewport.

In one embodiment, the content management system 400 provides an interactive viewport customized for a viewer 30 who is older in age (e.g., a senior person/citizen). Movement of the viewport is personalized to factor in the age of the viewer 30. For example, the speed at which the viewport pans its view from a current point location to another point location may be slower to minimize or reduce any motion sickness the viewer 30 may experience. As another example, the viewport may present/focus on points of interest that older people generally find interesting (e.g., scenes showing beautiful scenery instead of action scenes). The interactive viewport may be for content older people typically gravitate to, such as travel-related content. Some individuals may have issues with VR goggles or headsets because such VR devices are deemed too heavy or inconvenient, and/or may cause disorientation. It has been discovered that seniors and people with balance or cognitive challenge benefit from the interactive viewport solution as they are able to enjoy rich content without wearing VR goggles or headsets, while maintaining the ability to switch viewport.

Figure 5B:
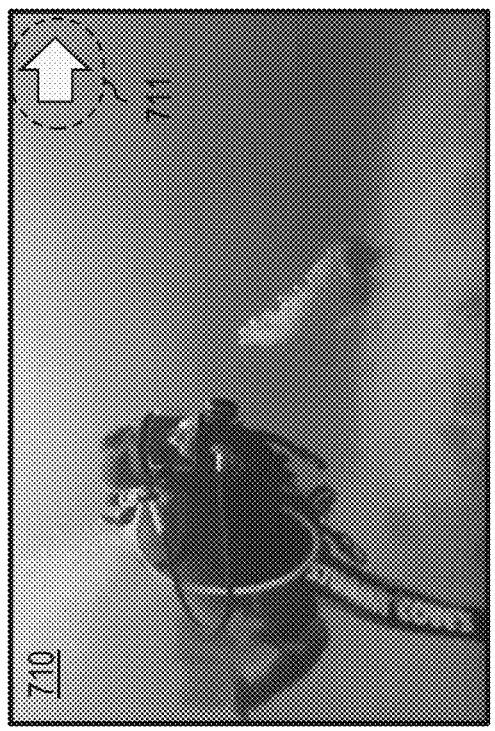
FIG. 5B illustrates an example viewport with an augmentation showing a direction to one or more salient moments occurring in a piece of content, in one or more embodiments.
Figure 5A:
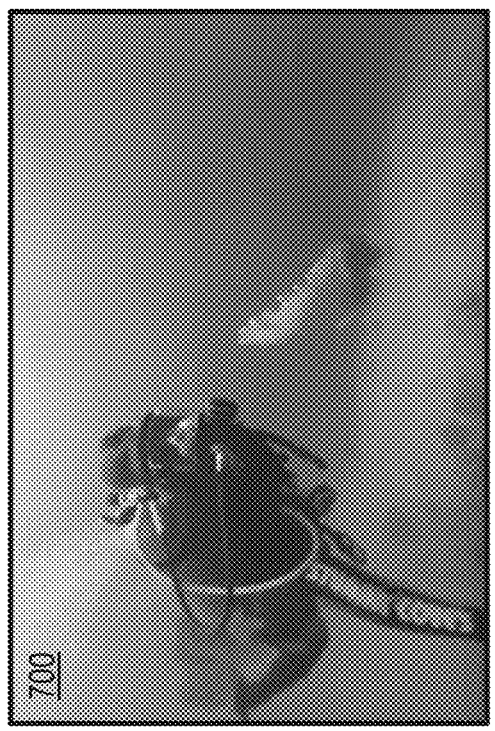
FIG. 5A illustrates an example conventional viewport for viewing a piece of content.

FIG. 5A illustrates an example conventional viewport 700 for viewing a piece of content. The viewport 700 provides an un-augmented experience where no augmented reality augmentations are included in the viewport 700. For example, if the piece of content comprises a 360 degree video, the viewport 700 provides a view presenting a director's cut.

FIG. 5B illustrates an example viewport 710 with an augmentation showing a direction to one or more salient moments occurring in a piece of content, in one or more embodiments. The viewport 710 provides an augmented experience wherein one or more augmented reality augmentations are included in the viewport 710. Specifically, as shown in FIG. 5B, the viewport 710 presents an augmentation 711 comprising a visual cue corresponding to one or more salient moments occurring in the piece of content. In one embodiment, the visual cue comprises a directional marker indicating a suggested direction to move the viewport to navigate to a point location where the one or more salient moments occur. The suggested direction is relative to the current view of the viewport 710. In another embodiment, the visual cue comprises a magnifying glass indicating a suggested point location the viewport 710 should zoom in to focus on the one or more salient moments. The suggested point location is relative to the current view.

In response to the user interface unit 410 detecting a viewer interaction with the augmentation 711, the navigation planner 450 sends an instruction/command to the viewport movement manager 440 to update the viewport on the display screen 310. The viewport is updated by adapting a recommended path for the viewport to an updated recommended path that includes a point location or a point of interest specified by the augmentation. The updated viewport focuses on the point location or a point of interest specified by the augmentation.

Figure 5C:
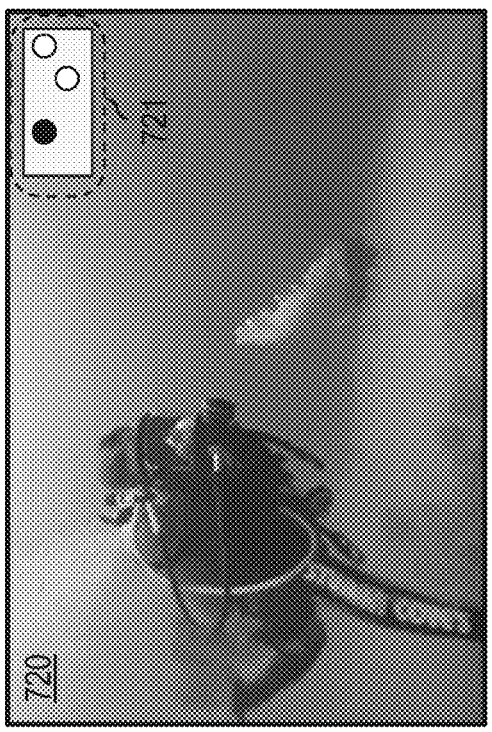
FIG. 5C illustrates another example viewport with an augmentation showing a location of one or more salient moments occurring in a piece of content, in one or more embodiments.

FIG. 5C illustrates another example viewport 720 with an augmentation showing a location of one or more salient moments occurring in a piece of content, in one or more embodiments. The viewport 720 provides an augmented experience wherein one or more augmented reality augmentations are included in the viewport 720. Specifically, as shown in FIG. 5C, the viewport 720 presents an augmentation 721 comprising a scaled miniature map including one or more indicators (e.g., icons such as dots, images, etc.). Each indicator corresponds to a salient moment occurring in the piece of content. Each indicator is positioned on the map based on a point location of a corresponding salient moment relative to a current view of the viewport 720. Each indicator may be color coded based on one of type or strength score for a corresponding salient moment.

In response to the user interface unit 410 detecting a viewer interaction with an indicator corresponding to a salient moment included in the augmentation 721, the navigation planner 450 sends an instruction/command to the viewport movement manager 440 to update the viewport on the display screen 310. The viewport is updated by adapting a recommended path for the viewport to an updated recommended path that includes a point location or a point of interest represented by the corresponding salient moment. The updated viewport focuses on a point location or a point of interest represented by the corresponding salient moment.

FIG. 6 is an example spatio-temporal graph 950 illustrating different types of salient moments 701 occurring in a piece of content, in one or more embodiments. Each node of the graph 950 represents a salient moment occurring in the piece of content. The graph 950 indicates where each salient moment occurs (i.e., point location/position) and when the salient moment occurs (i.e., time) during playback of the piece of content.

As shown in FIG. 6, the piece of content includes different types of salient moments 701, such as one or more salient moments 701 of Type A (e.g., salient moments $A_1$, $A_2$, and $A_3$), one or more salient moments 701 of Type B (e.g., salient moments $B_1$, $B_2$, and $B_3$), one or more salient moments 701 of Type C (e.g., salient moments $C_1$, $C_2$, $C_3$, and $C_4$), and one or more salient moments 701 of Type D (e.g., salient moments $D_1$, $D_2$, $D_3$, and $D_4$).

As shown in FIG. 6, the salient moments 701 are represented by nodes of different shapes and different sizes. A size and a shape of a node representing a salient moment 701 indicates where and when the salient moment 701 occurred in the piece of content (i.e., time/duration and space occupied by the salient moment 701 in the piece of content).

Figure 7:
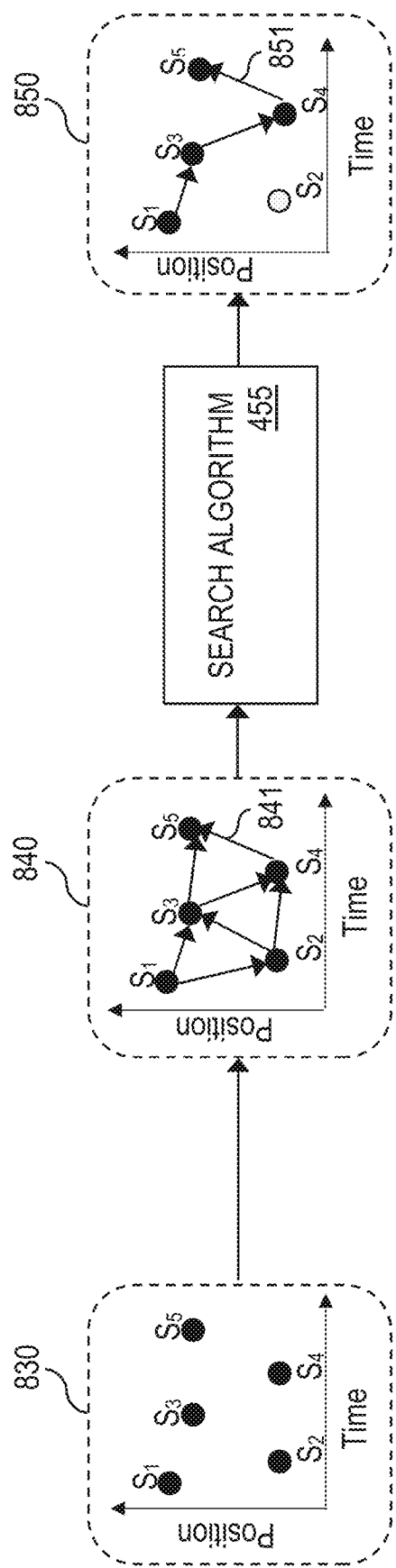
FIG. 7 illustrates a process of determining a recommended path for a viewport for a piece of content, in one or more embodiments.

FIG. 7 illustrates a process of determining a recommended path for a viewport for a piece of content, in one or more embodiments. As shown in FIG. 7, a first spatio-temporal graph 830 comprises a plurality of nodes representing a plurality of salient moments identified in the piece of content, such as salient moments $S_1$, $S_2$, $S_3$, $S_4$, and $S_5$.

The navigation planner 450 determines a recommended path for a viewport by determining which of the salient moments occurring in the piece of content to present in the viewport. In one embodiment, the navigation planner 450 determines which of the salient moments to present based on a state space search algorithm 455. A second spatio-temporal graph 840 is shown in FIG. 7. The second spatio-temporal graph 840 is an example representation of converting the first spatio-temporal graph 830 into a graph structure with edges 841. Each edge 841 represents a potential/possible transition between salient moments that the state space search algorithm may consider making. As shown in FIG. 7, each edge 841 points forward in time. Each salient moment in the second spatio-temporal graph 840 may be connected to another salient moment using various methods. For example, a salient moment may be connected to another salient moment that is nearest to it in time and/or space.

A third spatio-temporal graph 850 is shown in FIG. 7. The third spatio-temporal graph 850 illustrates a recommended path that results from applying the state space search algorithm. As shown in FIG. 7, the recommended path 851 includes salient moments $S_1$, $S_3$, $S_4$, and $S_5$. As salient moment $S_2$ is not included in the recommended path 851, salient moment $S_2$ is bypassed in the viewport. The movement of the viewport during playback of the piece of content is controlled based on the recommended path 851. If there is no viewer interaction with the viewport, the salient moments will be viewed with first $S_1$, then $S_3$, then $S_4$, and finally $S_5$ are put in view of a viewer 30 during playback of the piece of content.

Figure 8:
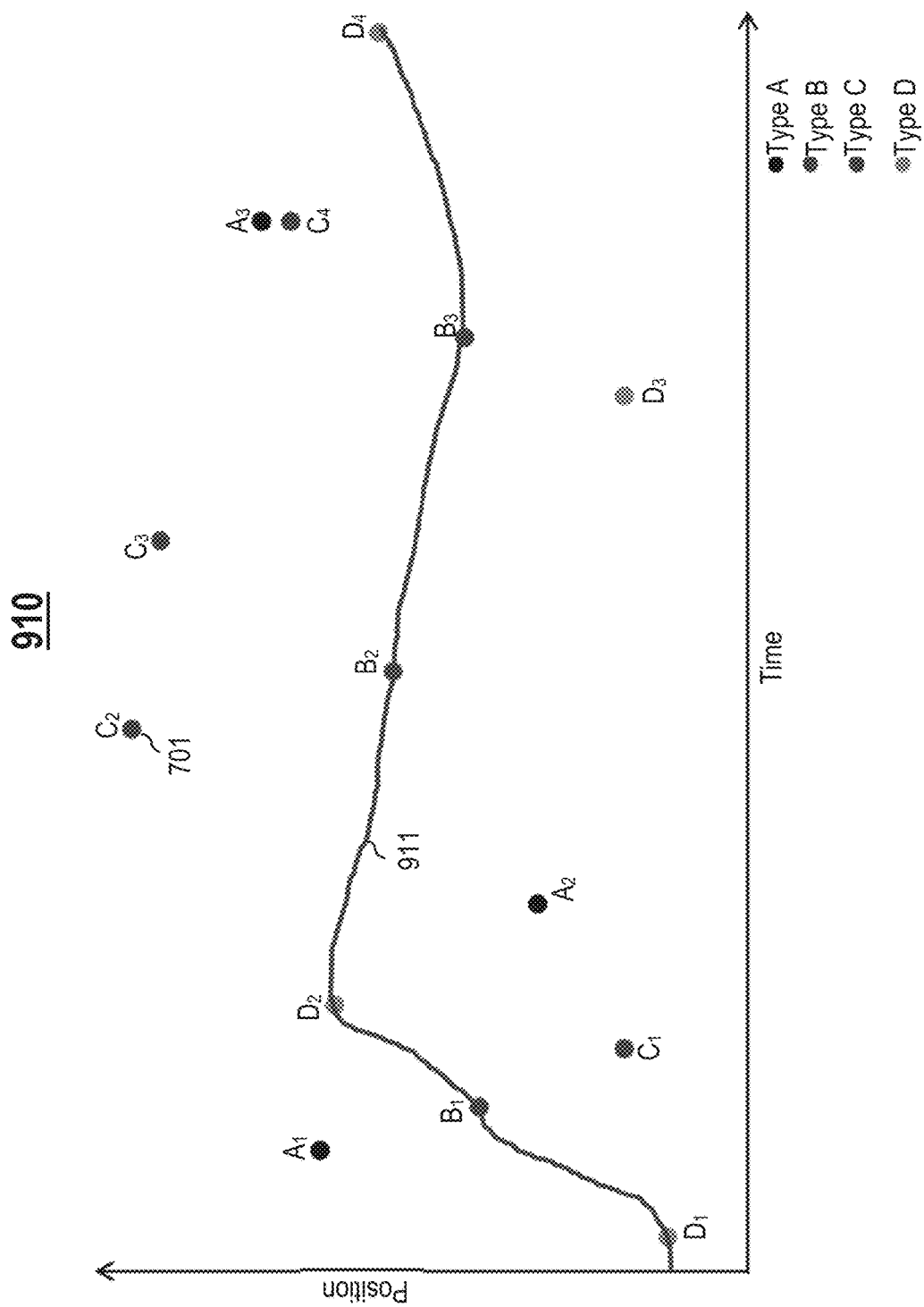
FIG. 8 is an example spatiotemporal graph illustrating an example recommended path for a viewport for a piece of content, in one or more embodiments.

FIG. 8 is an example spatio-temporal graph 910 illustrating an example recommended path 911 for a viewport for a piece of content, in one or more embodiments. As shown in FIG. 8, if there is no viewer interaction with the viewport, the recommended path 911 for the viewport results in a viewer 30 viewing the following salient moments 701 in order during playback of the piece of content: $D_1$, $B_1$, $D_2$, $B_2$, $B_3$, and $D_4$. The recommended path 911 favors salient moments of Type B as it includes all salient moments of Type B occurring in the piece of content (i.e., salient moments $B_1$, $B_2$, and $B_3$).

Figure 9:
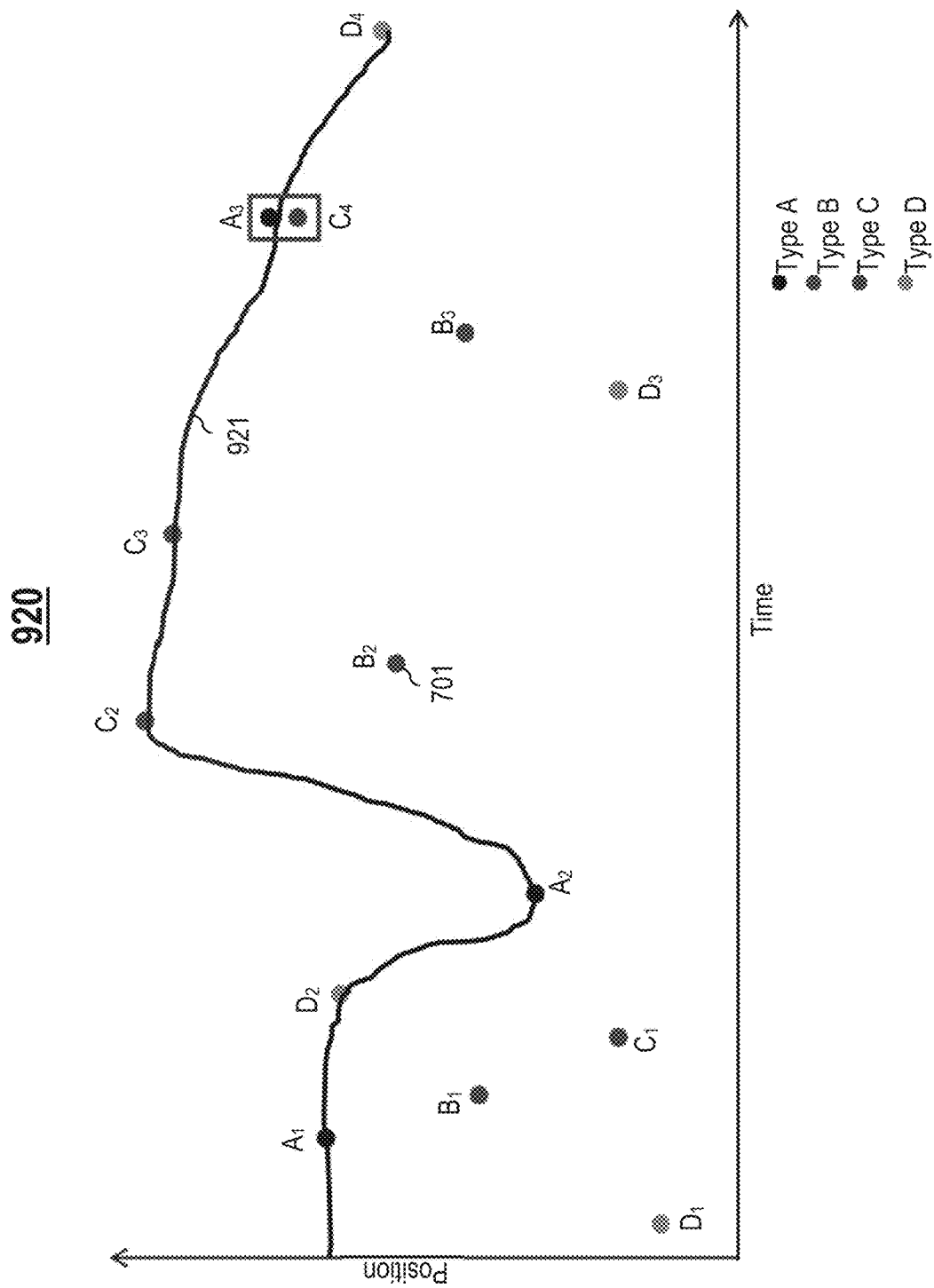
FIG. 9 is an example spatiotemporal graph illustrating another example recommended path for a viewport for a piece of content, in one or more embodiments.

FIG. 9 is an example spatio-temporal graph 920 illustrating another example recommended path 921 for a viewport for a piece of content, in one or more embodiments. As shown in FIG. 9, if there is no viewer interaction with the viewport, the recommended path 921 for the viewport results in a viewer 30 viewing the following salient moments 701 in order during playback of the piece of content: $A_1$, $D_2$, $A_2$, $C_2$, $C_3$, $A_3$, and $D_4$. The recommended path 921 favors salient moments of Type A as it includes all salient moments of Type A occurring in the piece of content (i.e., salient moments $A_1$, $A_2$, and $A_3$).

As shown in FIG. 9, salient moment $C_4$ occurs within proximity of salient moment $A_3$ both spatially and temporally. In one embodiment, as salient moment $C_4$ is proximate to salient moment $A_3$, the viewport simultaneously presents both salient moments $A_3$ and $C_4$ in view of the viewer 30 when salient moment $A_3$ occurs. In another embodiment, if path 921 may be formed in a way that favors/values Type A salient moments over Type C salient moments, and the viewport presents in such a way that only salient moment $A_3$ is presented.

If salient moment $A_3$ is captured by multiple cameras, a preferred camera position for presenting salient moment $A_3$ is determined. To determine a preferred camera position, salient moments from additional camera views are represented with its own nodes in a spatio-temporal graph (e.g., spatio-temporal graph 830 in FIG. 7). The spatio-temporal graph is then converted into a graph structure with edges representing potential/possible transitions between salient moments (e.g., spatio-temporal graph 840 in FIG. 7). A search algorithm 455 is applied to the graph structure, resulting in a recommended path that includes salient moment $A_3$ captured from the preferred camera position.

Figure 10:
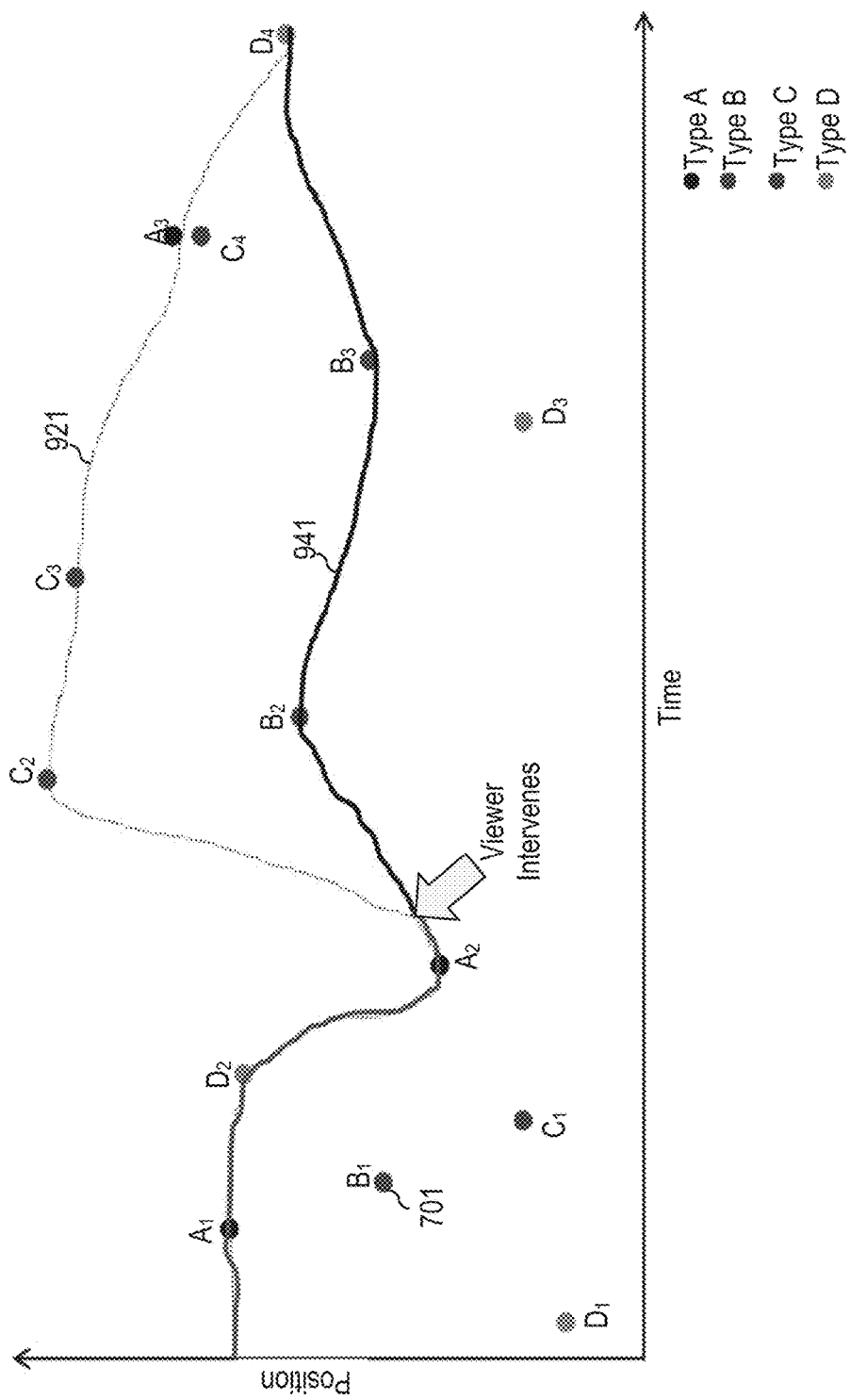
FIG. 10 is an example spatiotemporal graph illustrating viewer intervention during content playback, in one or more embodiments.

FIG. 10 is an example spatio-temporal graph 940 illustrating viewer intervention (i.e., user intervention) during content playback, in one or more embodiments. Movement of a viewport for a piece of content is initially based on an initial recommended path 921. If a viewer interaction with the viewport is detected (e.g., a viewer 30 interacts with an augmentation presented in the viewport), the movement of the viewport adjusts based on the viewer interaction.

For example, if the viewer interaction comprises a request to view salient moments 701 of Type B, the movement of the viewport shifts from the initial recommended path 921 to a new recommended path 941 that favors salient moments 701 of Type B (i.e., includes all remaining salient moments of Type B, such as salient moments $B_2$ and $B_3$). Specifically, the viewport movement manager 440 either pans to or directly jumps to a remaining salient moment of Type B. The decision as to whether to pan to or make a direct jump to the remaining salient moment of Type B may be based on user preferences and/or general preferences such as, but not limited to, an amount of time to pan a camera, user tolerance for direct jumps, maximum speed for panning the camera, etc. Further, the navigation planner 450 applies the search algorithm 455 to form a new recommended path 941 that favors salient moments 701 of Type B. The new recommended path 941 starts from a time point in the piece of content that the viewer intervention occurred till the end of the piece of content. The new recommended path 941 may or may not overlap with a remaining portion of the initial recommended path. The viewport is updated by adapting the initial recommended path 921 to the new recommended path 941. The updated viewport focuses on all remaining salient moments 701 of Type B.

Figure 11:
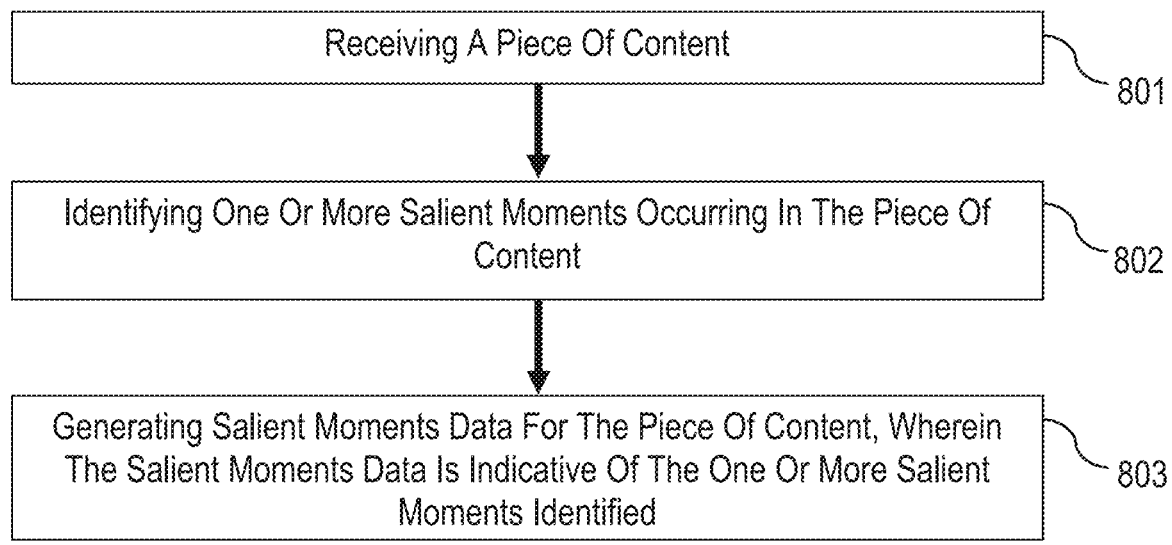
FIG. 11 is a flowchart of an example process for detecting salient moments, in one or more embodiments.

FIG. 11 is a flowchart of an example process 800 for detecting salient moments, in one or more embodiments. In process block 801, receive a piece of content. In process block 802, identify one or more salient moments occurring in the piece of content. In process block 803, generate salient moments data for the piece of content. The salient moments data is indicative of the one or more salient moments identified.

In one embodiment, process blocks 801-803 may be performed by the salient moments detector 500.

Figure 12:
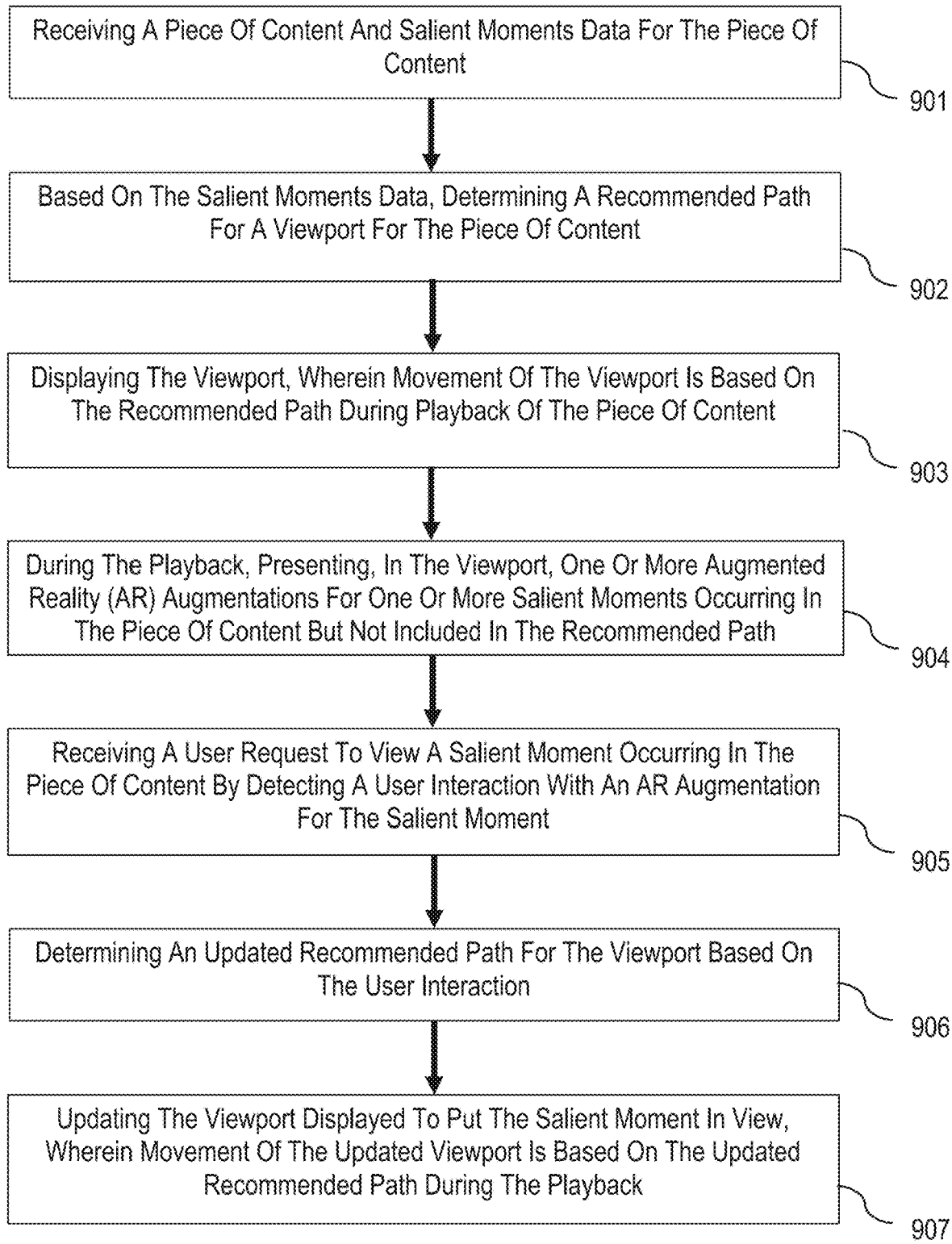
FIG. 12 is a flowchart of an example process for providing an interactive viewport, in one or more embodiments.

FIG. 12 is a flowchart of an example process 900 for providing an interactive viewport, in one or more embodiments. In process block 901, receive a piece of content and salient moments data for the piece of content. In process block 902, based on the salient moments data, determine a recommended path for a viewport for the piece of content. In process block 903, display the viewport (e.g., on a display screen), wherein movement of the viewport is initially based on the recommended path during playback of the piece of content. In process block 904, during the playback, present, in the viewport, one or more augmented reality augmentations for one or more salient moments occurring in the piece of content but not included in the recommended path. In process block 905, receive a viewer request to view a salient moment occurring in the piece of content by detecting a viewer interaction with an augmented reality augmentation for the salient moment.

In process blocks 906-907, the recommended path for the viewport is adapted to an updated recommended path for the viewport, wherein the updated recommended path includes the salient moment. Specifically, in process block 906, determine an updated recommended path for the viewport based on the viewer interaction. In process block 907, update the viewport displayed to put the salient moment in view, wherein movement of the updated viewport is based on the updated recommended path during the playback.

In one embodiment, process blocks 901-907 may be performed by the content management system 400.

Figure 13:
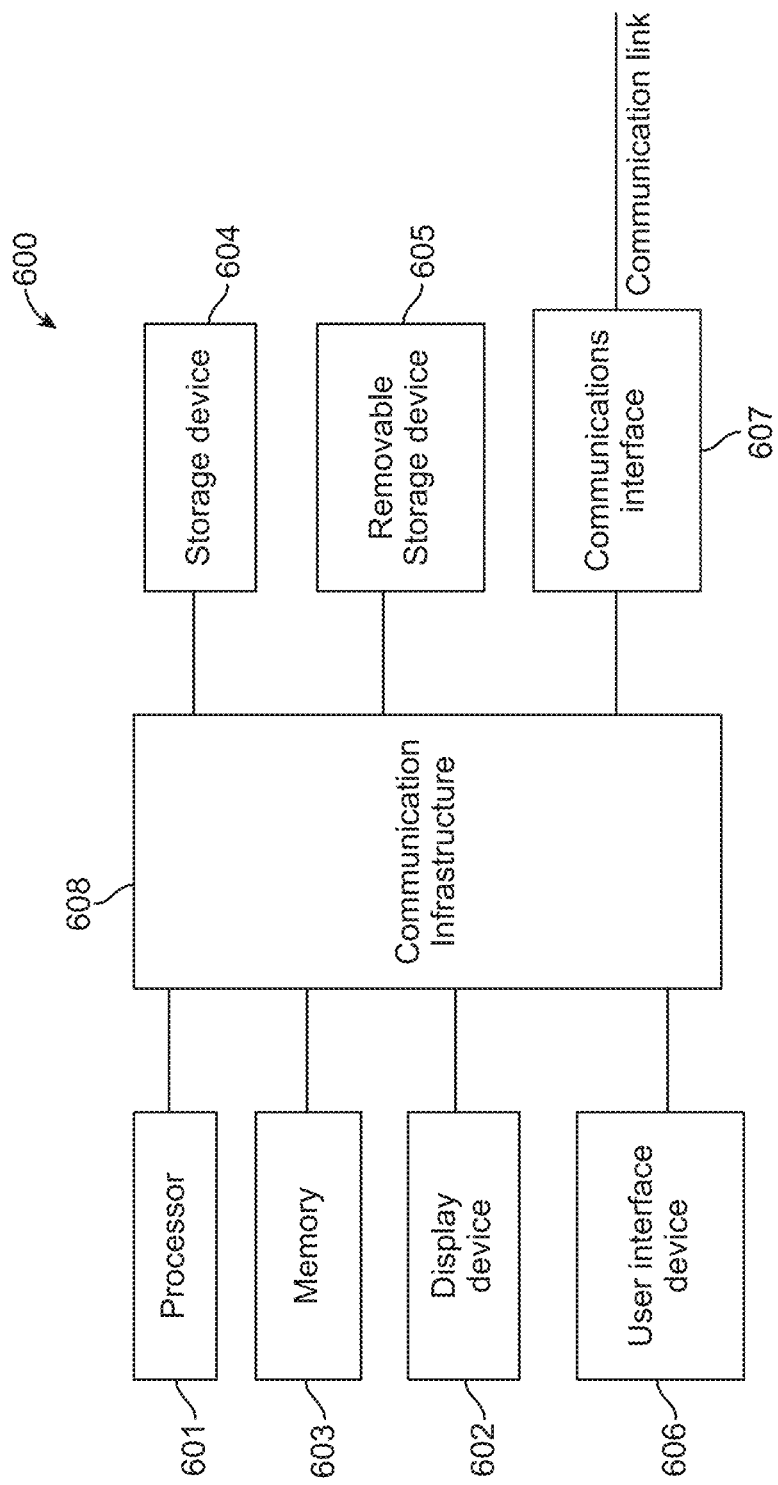
FIG. 13 is an exemplary high-level block diagram showing an information processing system comprising a computer system useful for implementing disclosed embodiments.

FIG. 13 is a high-level block diagram showing an information processing system comprising a computer system 600 useful for implementing the disclosed embodiments. Computer system 600 may be incorporated in a display device 300 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 11) and processing instructions for process 900 (FIG. 12) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
   receiving a piece of content and salient data for the piece of content;
   based on the salient data, determining a first path for a viewport for the piece of content, wherein the first path for the viewport includes different salient events occurring in the piece of content at different times during playback of the piece of content;
   providing the viewport on a display device, wherein movement of the viewport is based on the first path for the viewport and the salient data during the playback;
   detecting an additional salient event in the piece of content that is not included in the first path for the viewport; and
   providing an indication for the additional salient event in the viewport during the playback.

2. The method of claim 1, wherein the salient data identifies each salient event in the piece of content, and the salient data indicates, for each salient event in the piece of content, a corresponding point location of the salient event in the piece of content and a corresponding time at which the salient event occurs during the playback.

3. The method of claim 2, wherein the salient data further indicates, for each salient event in the piece of content, a corresponding type of the salient event and a corresponding strength value of the salient event.

4. The method of claim 1, wherein the first path for the viewport controls the movement of the viewport to put the different salient events in a view of the viewport at the different times during the playback.

5. The method of claim 1, further comprising:
   detecting one or more salient events in the piece of content based on at least one of the following: visual data of the piece of content, audio data of the piece of content, or content consumption experience data for the piece of content;

wherein the salient data is indicative of each salient event detected.

6. The method of claim 1, further comprising:

detecting one or more salient events in the piece of content based on at least one of the following: face recognition, facial emotion recognition, object recognition, motion recognition, or metadata of the piece of content;

wherein the salient data is indicative of each salient event detected.

7. The method of claim 1, further comprising:

detecting user interaction with the indication, wherein the indication comprises an interactive hint; and in response to detecting the user interaction:

adapting the first path for the viewport to a second path for the viewport based on the user interaction, wherein the second path for the viewport includes the additional salient event; and providing an updated viewport for the piece of content on the display device, wherein movement of the updated viewport is based on the second path for the viewport and the salient data during the playback, and the second path for the viewport controls the movement of the updated viewport to put the additional salient event in a view of the updated viewport.

8. The method of claim 7, further comprising:

changing a weight assigned to the additional salient event and one or more other salient events in the piece of content having the same type as the additional salient event.

9. The method of claim 7, wherein the second path for the viewport includes one or more other salient events in the piece of content having the same type as the additional salient event.

10. A system, comprising:

at least one processor; and a non-transitory processor-readable memory device storing instructions that when executed by the at least one processor causes the at least one processor to perform operations including:

receiving a piece of content and salient data for the piece of content;

based on the salient data, determining a first path for a viewport for the piece of content, wherein the first path for the viewport includes different salient events occurring in the piece of content at different times during playback of the piece of content;

providing the viewport on a display device, wherein movement of the viewport is based on the first path for the viewport and the salient data during the playback;

detecting an additional salient event in the piece of content that is not included in the first path for the viewport; and providing an indication for the additional salient event in the viewport during the playback.

11. The system of claim 10, wherein the salient data identifies each salient event in the piece of content, and the salient data indicates, for each salient event in the piece of content, a corresponding point location of the salient event in the piece of content and a corresponding time at which the salient event occurs during the playback.

12. The system of claim 11, wherein the salient data further indicates, for each salient event in the piece of content, a corresponding type of the salient event and a corresponding strength value of the salient event.

13. The system of claim 10, wherein the salient data is generated offline on a server.

14. The system of claim 10, the operations further comprising:

detecting one or more salient events in the piece of content based on at least one of the following: visual data of the piece of content, audio data of the piece of content, or content consumption experience data for the piece of content;

wherein the salient data is indicative of each salient event detected.

15. The system of claim 10, the operations further comprising:

detecting one or more salient events in the piece of content based on at least one of the following: face recognition, facial emotion recognition, object recognition, motion recognition, or metadata of the piece of content;

wherein the salient data is indicative of each salient event detected.

16. The system of claim 10, the operations further comprising:

detecting user interaction with the indication, wherein the indication comprises an interactive hint; and in response to detecting the user interaction:

adapting the first path for the viewport to a second path for the viewport based on the user interaction, wherein the second path for the viewport includes the additional salient event; and providing an updated viewport for the piece of content on the display device, wherein movement of the updated viewport is based on the second path for the viewport and the salient data during the playback, and the second path for the viewport controls the movement of the updated viewport to put the additional salient event in a view of the updated viewport.

17. The system of claim 16, the operations further comprising:

changing a weight assigned to the additional salient event and one or more other salient events in the piece of content having the same type as the additional salient event.

18. The system of claim 16, wherein the second path for the viewport includes one or more other salient events in the piece of content having the same type as the additional salient event.

19. A non-transitory computer readable storage medium including instructions to perform a method comprising:

receiving a piece of content and salient data for the piece of content;

based on the salient data, determining a first path for a viewport for the piece of content, wherein the first path for the viewport includes different salient events occurring in the piece of content at different times during playback of the piece of content;

providing the viewport on a display device, wherein movement of the viewport is based on the first path for the viewport and the salient data during the playback;

detecting an additional salient event in the piece of content that is not included in the first path for the viewport; and providing an indication for the additional salient event in the viewport during the playback.

20. The computer readable storage medium of claim 19, the method further comprising:

detecting user interaction with the indication, wherein the indication comprises an interactive hint; and in response to detecting the user interaction:

adapting the first path for the viewport to a second path for the viewport based on the user interaction, wherein the second path for the viewport includes the additional salient event; and providing an updated viewport for the piece of content on the display device, wherein movement of the updated viewport is based on the second path for the viewport and the salient data during the playback, and the second path for the viewport controls the movement of the updated viewport to put the additional salient event in a view of the updated viewport.

\* \* \* \* \*